US010025609B2

(12) United States Patent
Rong et al.

(10) Patent No.: US 10,025,609 B2
(45) Date of Patent: Jul. 17, 2018

(54) VIRTUAL MACHINE (VM)-TO-VM FLOW CONTROL FOR OVERLAY NETWORKS

(71) Applicant: International Business Machines Corporation, Armonk, NY (US)

(72) Inventors: Liang Rong, Jiangsu (CN); Gang Tang, Nanjing (CN); Zi Jin Tao, Wuxi (CN); Ming Shuang Xian, Wuxi (CN); Yi Jing Zhu, Wuxi (CN)

(73) Assignee: International Business Machines Corporation, Armonk, NY (US)

( * ) Notice: Subject to any disclaimer, the term of this patent is extended or adjusted under 35 U.S.C. 154(b) by 96 days.

(21) Appl. No.: 14/694,950

(22) Filed: Apr. 23, 2015

(65) Prior Publication Data
US 2016/0314012 A1  Oct. 27, 2016

(51) Int. Cl.
| | | |
|---|---|---|
| *G06F 9/455* | (2018.01) | |
| *H04L 12/801* | (2013.01) | |
| *H04L 29/08* | (2006.01) | |
| *H04L 12/931* | (2013.01) | |

(52) U.S. Cl.
CPC ........ *G06F 9/45558* (2013.01); *H04L 47/115* (2013.01); *H04L 49/70* (2013.01); *H04L 67/2842* (2013.01); *G06F 2009/45595* (2013.01)

(58) Field of Classification Search
None
See application file for complete search history.

(56) References Cited

U.S. PATENT DOCUMENTS

| | | | | |
|---|---|---|---|---|
| 5,768,258 A | * | 6/1998 | Van As | H04L 12/5602 370/235 |
| 7,706,277 B2 | * | 4/2010 | Chandra | H04L 47/10 370/236 |
| 7,730,201 B1 | * | 6/2010 | McAllister | H04L 12/5602 709/233 |
| 8,161,182 B1 | * | 4/2012 | Cheng | H04L 47/10 370/235 |
| 8,174,984 B2 | | 5/2012 | Tripathi et al. | |
| 8,370,834 B2 | * | 2/2013 | Edwards | G06F 9/5077 709/238 |

(Continued)

OTHER PUBLICATIONS

Ramakrishnan et al, RFC-3168: The Addition of Explicit Congestion Notification (ECN) to IP, IETF, 2001, pp. 1-63.*
Rong et al., U.S. Appl. No. 15/953,225, filed Apr. 13, 2018.

*Primary Examiner* — Abu Zar Ghaffari
(74) *Attorney, Agent, or Firm* — Zilka Kotab, P.C.

(57) ABSTRACT

In one embodiment, a method includes receiving, using a controller, a congestion notification message from a first virtual switch of a first server indicating that a first virtual machine (VM) hosted by the first server is overloaded, and advertising, using the controller, a congestion status of the first VM to one or more virtual switches in a network using a congestion status message in response to receiving the congestion notification message. In another embodiment, a method includes receiving, using a first virtual switch of a first server, a congestion status message from a controller indicating that a second VM hosted by a second server is overloaded, and stopping traffic that is destined for the second VM from being sent in response to receiving the congestion status message from the controller without restricting sending traffic that is destined for other VMs hosted by the second server.

19 Claims, 8 Drawing Sheets

(56) References Cited

U.S. PATENT DOCUMENTS

| | | | |
|---|---|---|---|
| 8,650,299 B1* | 2/2014 | Huang | G06F 9/5077 709/226 |
| 8,705,349 B2* | 4/2014 | Bloch | H04L 47/263 370/229 |
| 8,873,389 B1* | 10/2014 | Noureddine | H04L 47/15 370/231 |
| 8,897,140 B1* | 11/2014 | Bhattacharya | H04L 47/122 370/237 |
| 9,036,481 B1* | 5/2015 | White | H04L 47/11 370/235 |
| 9,130,879 B2* | 9/2015 | Petrus | H04L 69/22 |
| 9,338,515 B2* | 5/2016 | Hu | H04N 21/21805 |
| 9,544,233 B2* | 1/2017 | Ansari | H04L 12/18 |
| 9,680,694 B1* | 6/2017 | Kotrabasappa | H04L 41/0654 |
| 9,703,743 B2* | 7/2017 | Sindhu | G06F 13/4081 |
| 2008/0159128 A1* | 7/2008 | Shaffer | H04L 47/10 370/229 |
| 2008/0259798 A1* | 10/2008 | Loh | H04L 45/302 370/235 |
| 2009/0300209 A1* | 12/2009 | Elzur | H04L 47/10 709/234 |
| 2010/0128605 A1* | 5/2010 | Chavan | H04L 47/10 370/230.1 |
| 2012/0063316 A1* | 3/2012 | Ghanwani | H04L 47/10 370/235 |
| 2012/0072909 A1* | 3/2012 | Malik | H04L 12/4641 718/1 |
| 2012/0163175 A1 | 6/2012 | Gupta | |
| 2012/0275328 A1* | 11/2012 | Iwata | H04L 12/4633 370/252 |
| 2013/0055245 A1* | 2/2013 | Tsirkin | G06F 9/545 718/1 |
| 2013/0086236 A1* | 4/2013 | Baucke | H04L 45/50 709/223 |
| 2013/0166773 A1 | 6/2013 | Armstrong et al. | |
| 2013/0329605 A1* | 12/2013 | Nakil | H04L 41/0668 370/255 |
| 2013/0343191 A1* | 12/2013 | Kim | H04L 47/11 370/235 |
| 2014/0071831 A1* | 3/2014 | Sinha | H04L 41/0213 370/241.1 |
| 2014/0126371 A1* | 5/2014 | Choi | H04L 47/24 370/235 |
| 2014/0241353 A1* | 8/2014 | Zhang | H04L 45/74 370/390 |
| 2014/0310362 A1* | 10/2014 | Babu | H04L 47/33 709/206 |
| 2015/0029853 A1* | 1/2015 | Raindel | H04L 47/127 370/235 |
| 2015/0195137 A1* | 7/2015 | Kashyap | H04L 41/0893 370/254 |
| 2015/0195178 A1* | 7/2015 | Bhattacharya | H04L 45/745 718/1 |
| 2015/0358458 A1* | 12/2015 | Jenkins | H04L 65/1046 370/230 |
| 2016/0014029 A1* | 1/2016 | Yuan | H04L 45/50 370/236 |
| 2016/0094650 A1* | 3/2016 | Garcia de Rio | H04L 47/78 709/226 |
| 2016/0261501 A1* | 9/2016 | Hegde | H04L 47/12 |

\* cited by examiner

US 10,025,609 B2

VIRTUAL MACHINE (VM)-TO-VM FLOW CONTROL FOR OVERLAY NETWORKS

TECHNICAL FIELD

The present invention relates to overlay networks, and more particularly, this invention relates to supporting virtual machine (VM)-to-VM flow control in overlay networks.

BACKGROUND

Network virtualization is implemented by many vendors using overlay technologies, such as Virtual Extensible Local Area Network (VXLAN), Network Virtualization using Generic Routing Encapsulation (NVGRE), etc., to form tunnels. These technologies enable multiple virtual networks to be utilized over the same physical network. Usually, a virtual switch component in a host or a virtualization layer (e.g., a hypervisor) provides the virtual ports which may be used to associate VMs to the various virtual networks.

SUMMARY

In one embodiment, a computer program product includes a computer readable storage medium having program instructions embodied therewith, the embodied program instructions executable by one or more processors to cause at least one of the one or more processors to receive, using a first virtual switch of a first server, a congestion status message from a controller indicating that a second virtual machine (VM) hosted by a second server is overloaded, and stop sending traffic that is destined for the second VM in response to receiving the congestion status message from the controller without restricting sending traffic that is destined for other VMs hosted by the second server.

In another embodiment, a computer program product includes a computer readable storage medium having program instructions embodied therewith, the embodied program instructions executable by a controller to cause the controller to receive a congestion notification message from a first virtual switch of a first server indicating that a first VM hosted by the first server is overloaded, and advertise a congestion status of the first VM in a congestion status message to one or more virtual switches in a network in response to receiving the congestion notification message.

In yet another embodiment, a method includes receiving, using a controller, a congestion notification message from a first virtual switch of a first server indicating that a first VM hosted by the first server is overloaded, and advertising, using the controller, a congestion status of the first VM to one or more virtual switches in a network using a congestion status message in response to receiving the congestion notification message.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In one general embodiment, a computer program product includes a computer readable storage medium having program instructions embodied therewith, the embodied program instructions executable by one or more processors to cause at least one of the one or more processors to receive, using a first virtual switch of a first server, a congestion status message from a controller indicating that a second virtual machine (VM) hosted by a second server is overloaded, and stop sending traffic that is destined for the second VM in response to receiving the congestion status message from the controller without restricting sending traffic that is destined for other VMs hosted by the second server.

In another general embodiment, a computer program product includes a computer readable storage medium having program instructions embodied therewith, the embodied program instructions executable by a controller to cause the controller to receive a congestion notification message from a first virtual switch of a first server indicating that a first VM hosted by the first server is overloaded, and advertise a congestion status of the first VM in a congestion status message to one or more virtual switches in a network in response to receiving the congestion notification message.

In yet another general embodiment, a method includes receiving, using a controller, a congestion notification message from a first virtual switch of a first server indicating that a first VM hosted by the first server is overloaded, and advertising, using the controller, a congestion status of the first VM to one or more virtual switches in a network using a congestion status message in response to receiving the congestion notification message.

Figure 1:
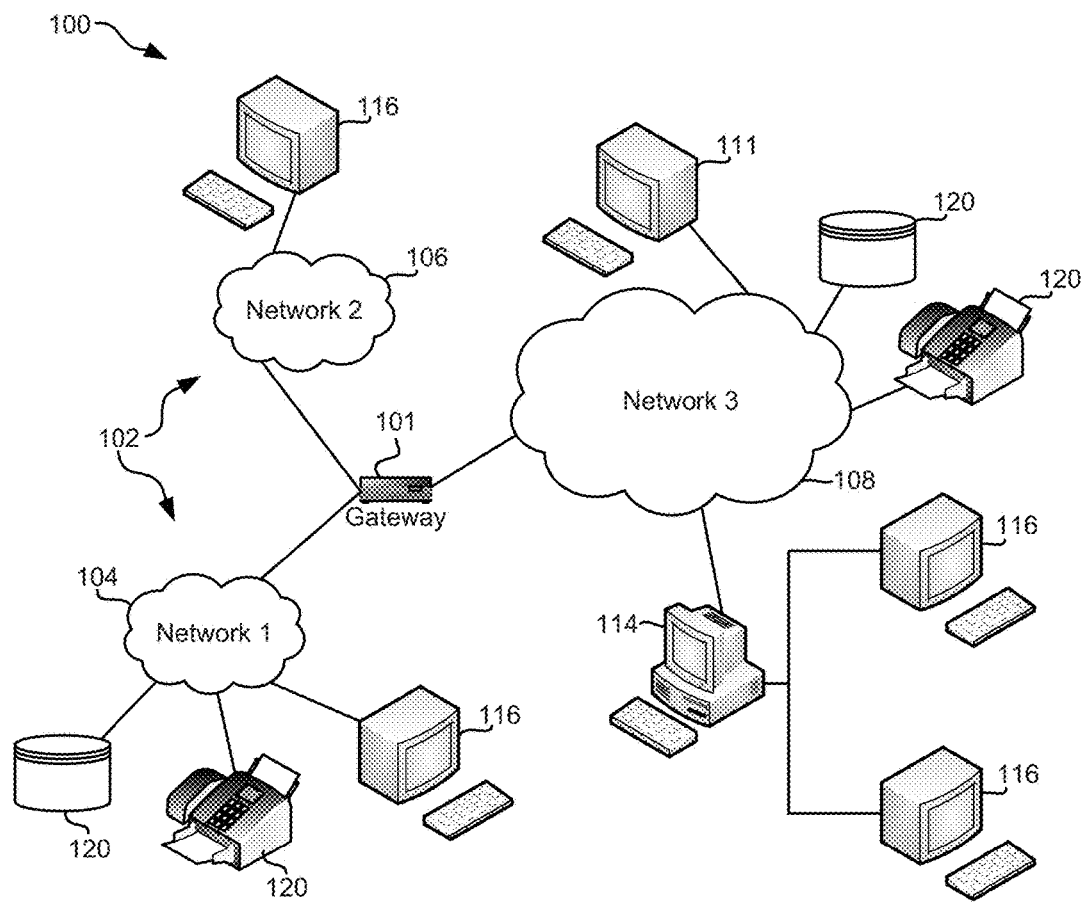
FIG. 1 illustrates a network infrastructure, in accordance with one embodiment.

FIG. 1 illustrates a network infrastructure 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, or a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
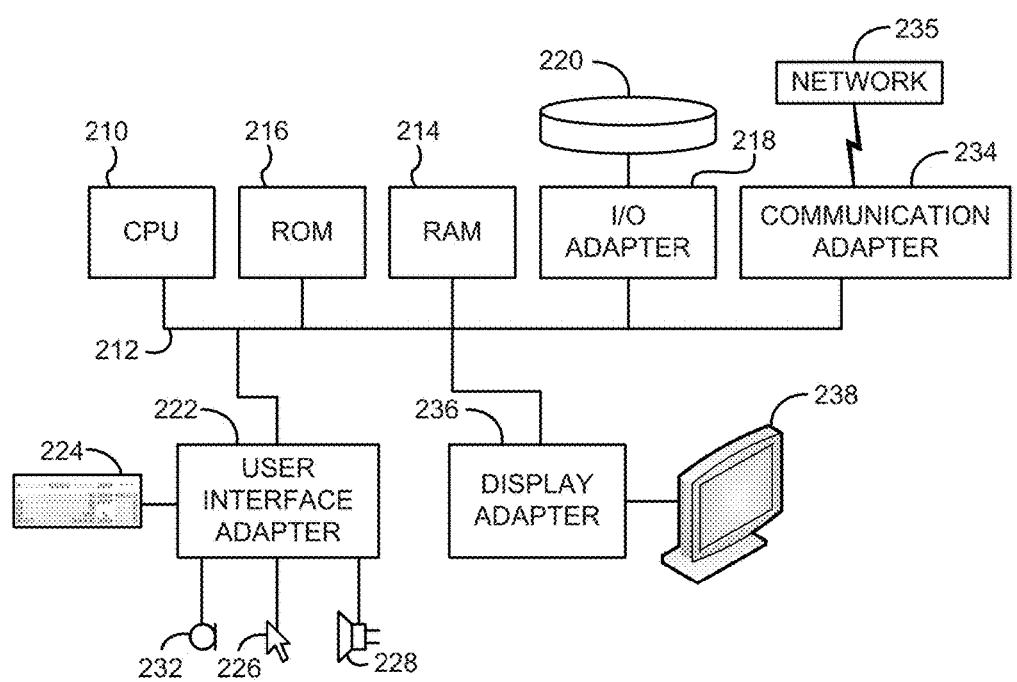
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238. Network 235 is an example of each of networks 104, 106, and 108 of FIG. 1.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Figure 3:
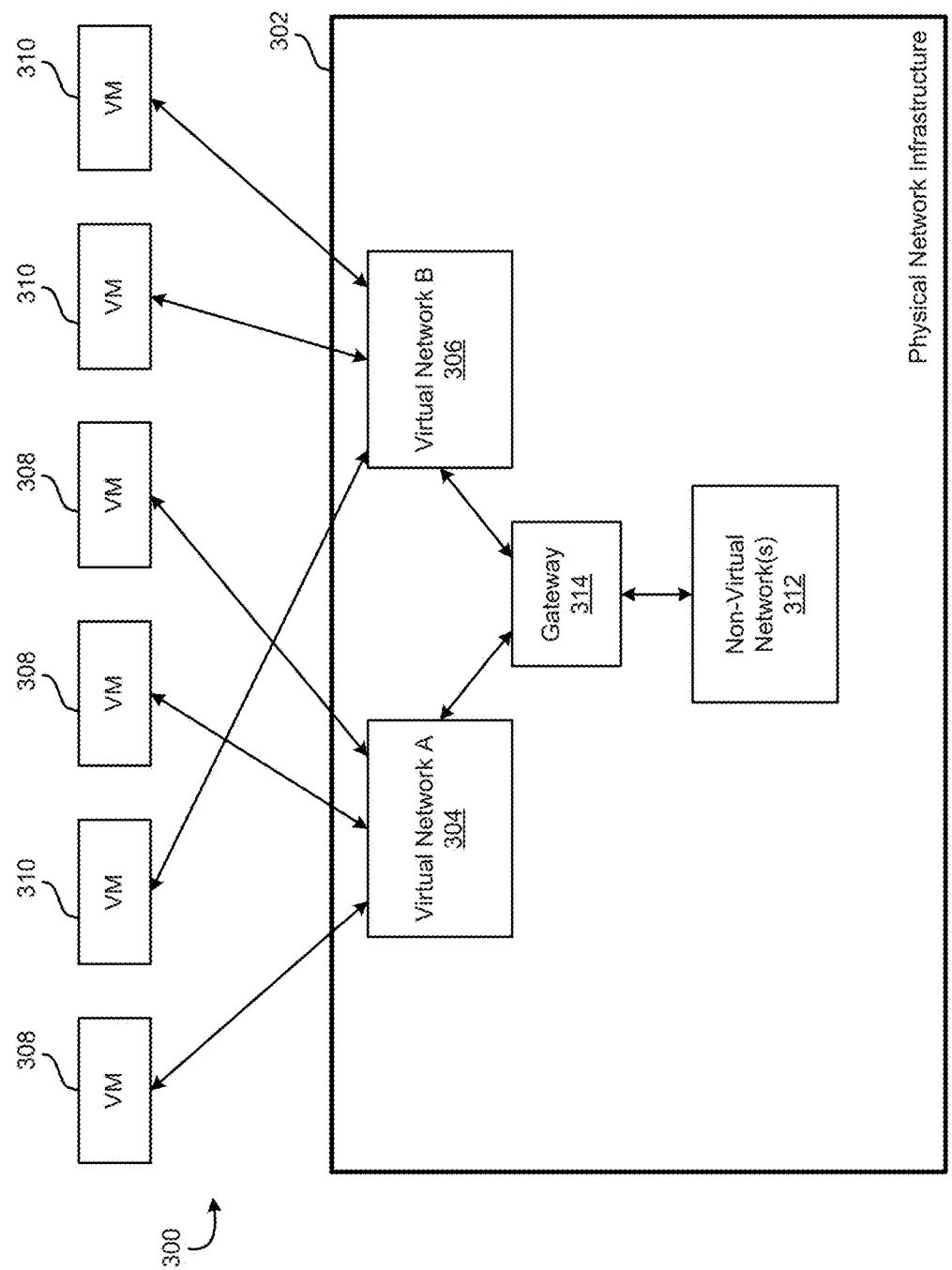
FIG. 3 shows a conceptual view of an overlay network, according to one embodiment.

Referring now to FIG. 3, a conceptual view of an overlay network 300 is shown according to one embodiment. In order to virtualize network services, other than simply providing a fabric path (connectivity) between devices, services may be rendered on packets as they move through a gateway 314 which provides routing and forwarding for packets moving between non-virtual network(s) 312 and Virtual Network A 304 and Virtual Network B 306. Gateway 314 is an example of gateway 101 of FIG. 1. Non-virtual network(s) 312 can include one or more of networks 104, 106, and 108 of FIG. 1. Referring again to FIG. 3, the one or more virtual networks 304, 306 exist within a physical (real) network infrastructure 302. The network infrastructure 302 is an example of the network infrastructure of FIG. 1 and may include any components, hardware, software, and/ or functionality typically associated with and/or used in a network infrastructure, including, but not limited to, switches, connectors, wires, circuits, cables, servers, hosts, storage media, operating systems, applications, ports, I/O, etc., as would be known by one of skill in the art. Referring again to FIG. 3, this network infrastructure 302 supports at least one non-virtual network 312, which may be a legacy network.

Each virtual network 304, 306 may use any number of VMs 308, 310. In one embodiment, Virtual Network A 304 includes one or more VMs 308, and Virtual Network B 306 includes one or more VMs 310. As shown in FIG. 3, the VMs 308, 310 are not shared by the virtual networks 304, 306, but instead are exclusively included in only one virtual network 304, 306 at any given time.

Components of overlay network 300 typically identify where to route packets based on a virtual network identifier, referred to as a VNI or VNID. This is typically a 24-bit code or number, which excludes 0x0 and 0xFFFFFF. The overlay network 300 has the capability of tunneling a Layer-2 (L2) packet over the Layer-3 (L3) network by encapsulating the L2 packet into an overlay header. This may be performed using virtual extensible local area network (VXLAN) or some other overlay capable protocol, such as locator/ID separation protocol (LISP), overlay transport virtualization (OTV), Network Virtualization using Generic Routing Encapsulation (NVGRE), etc.

The packet may also be encapsulated in a user datagram protocol (UDP) and internet protocol (IP) UDP/IP header. The overlay network 300 may include one or more point-to-point tunnels, and/or point-to-multipoint tunnels. In addition, any of these tunnels may be created, removed, altered and modified based on any number of factors, such as new devices being added to the overlay network 300, removal of devices from the overlay network 300, startup of any end devices, i.e., devices managing tunnel end points, such as virtual overlay network gateways, Hypervisors, switches capable of overlay functionality, etc.

Figure 4:
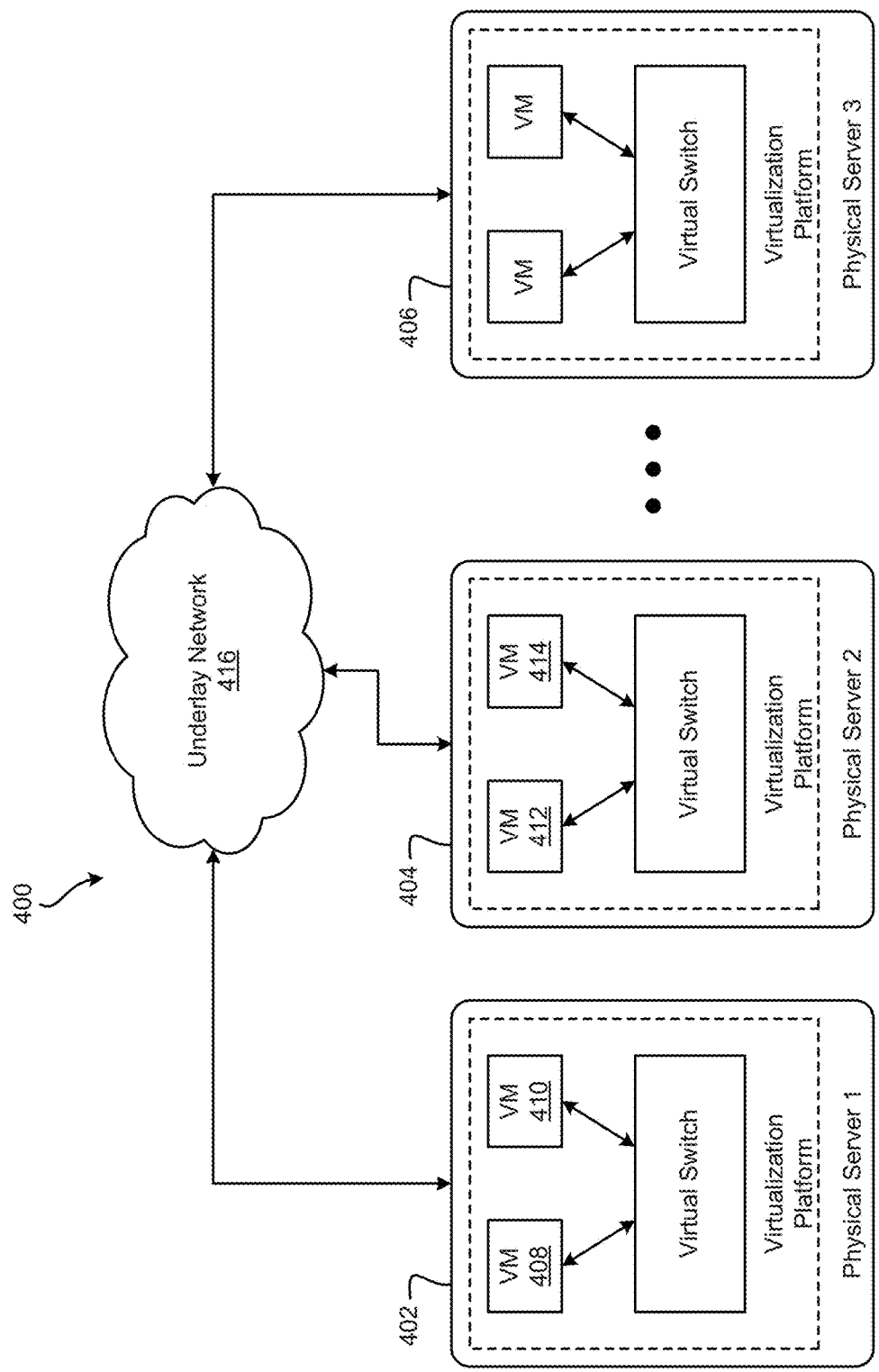
FIG. 4 is a block diagram of an overlay network that is used to describe problems that arise with the use of IEEE 802.3x Flow Control in the overlay network.

FIG. 4 is a block diagram of an overlay network 400 that is used to describe problems that arise with the use of IEEE 802.3x Flow Control in the overlay network 400. While communication within a virtual network is typically a given, it is possible to allow or control communication across virtual networks. IEEE 802.3x Flow Control is a standard which is designed to provide lossless operation between peer nodes by sending a "Pause Frame" from a node that instructs a peer node to stop transmission to the node for a period of time specified in the Pause Frame. However, when attempted to be utilized in overlay networks, many problems arise with the IEEE 802.3x Flow Control standard.

Referring again to FIG. 4, overlay network 400 includes three physical servers 402, 404, and 406. Each of physical servers 402, 404, and 406 hosts two VMs. As an example of the problems that are encountered in overlay networks with the use of Pause Frames, assume that VM 408 on physical server 402 is sending traffic (which includes a plurality of network packets) to VM 412 on physical server 404, while VM 410 is sending traffic to VM 414. In this scenario, if VM 412 becomes overloaded due to the traffic being sent to it through the underlay network 416 from VM 408, physical server 404 will respond by sending a Pause Frame to the underlay network 416 in order to inhibit transmission of any further traffic from VM 408. In response, the underlay network 416 (or a device therein) sends a Pause Frame to physical server 402. After physical server 402 receives the Pause Frame, it stops transmitting any traffic to the underlay network 416 for a period of time, regardless of whether the traffic originates from VM 408 or VM 410.

Therefore, IEEE 802.3x Flow Control has what is known as a head-of-line (HOL) blocking effect on VMs. Since physical server 402 has received the Pause Frame from the underlay network 416, it will stop sending packets transmitted from VM 410 to VM 414, even though VM 414 is not overloaded. Therefore, streams from VM 410 to VM 414 will be innocently throttled due to the overloaded status of VM 412.

Another problem with the Pause Frame is that it should traverse along every forwarding node (at least physical servers 402, 404, 406) in the underlay network 416 and finally arrive at the originating server (in this example, physical server 404). That traversing creates a number of forwarding hops and prolongs the flow control path unnecessarily. As a result, flow control provided using the Pause Frame may have poor responsiveness.

These flaws also apply to priority-based flow control (PFC) defined in IEEE 802.1Qbb when applied to overlay networks, as there is no explicit information carried in the Pause Frame header to indicate which VM is overwhelmed, e.g., VM 412. Therefore, all traffic is slowed to a particular server, e.g., physical server 404, not just the traffic headed to an overloaded VM, e.g., VM 412.

In one embodiment, congestion notification messages may be used to provide VM-to-VM flow control and overcome the problems of traditional flow control. Generally, the use of these congestion notification messages addresses the VM HOL blocking issue in any virtualized environment, including overlay networks, software-defined networks (SDNs), etc.

Figure 5:
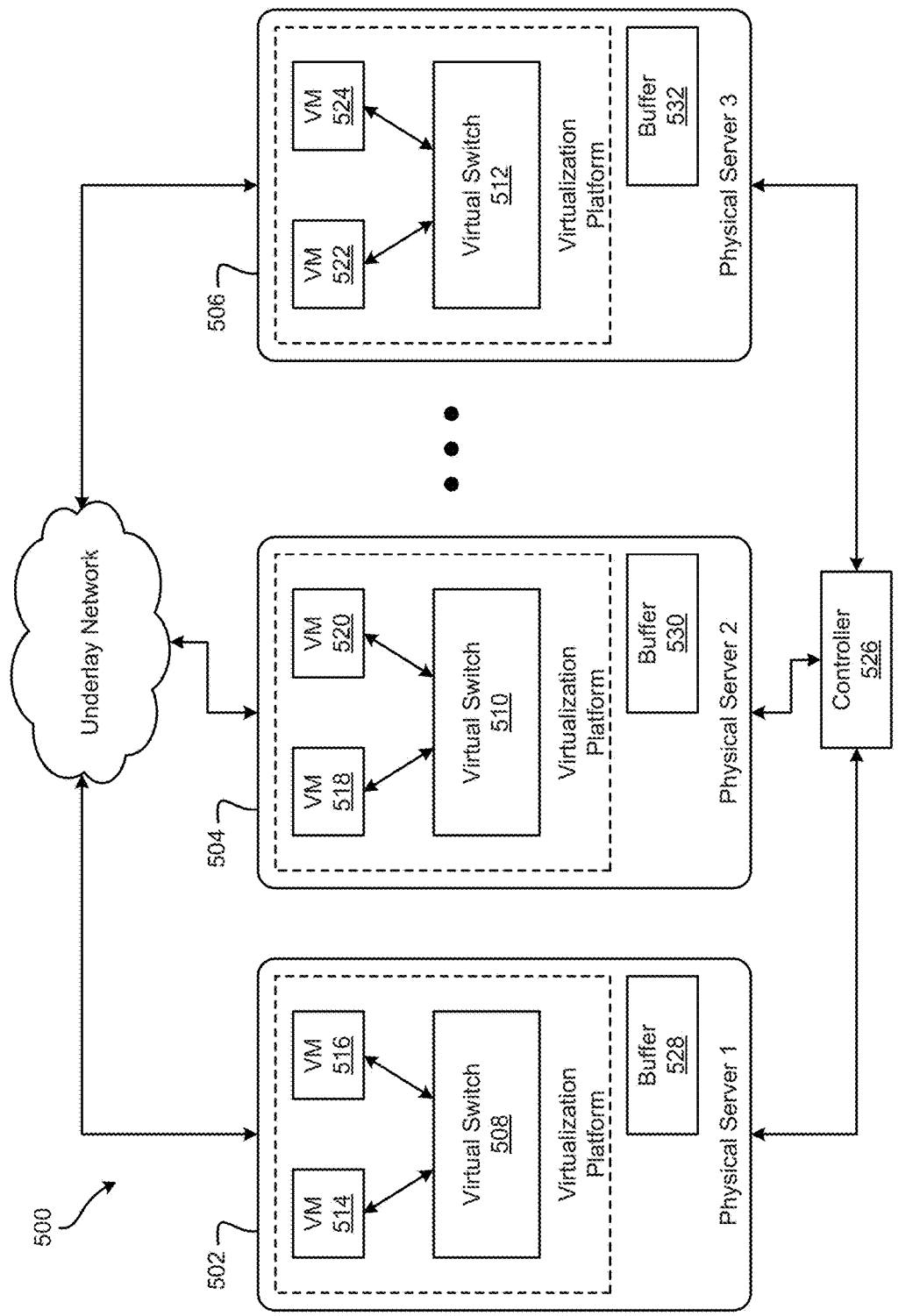
FIG. 5 is a block diagram of an overlay network in accordance with another embodiment.

FIG. 5 is a block diagram of an overlay network 500 according to one embodiment. In this overlay network 500, each virtual switch 508, 510, 512 of each respective physical server (or host) 502, 504, 506 is configured to monitor congestion for each VM that is hosted by the respective server. For example, server 502 hosts (e.g., provides physical resources to operate) virtual switch 508, VM 514, and VM 516, server 504 hosts virtual switch 510, VM 518, and VM 520, and server 506 hosts virtual switch 512, VM 522, and VM 524. Each server 502, 504, 506 is in communication with a controller 526 that is configured to provide control plane functionality to the virtual switch 508, 510, 512 of each server 502, 504, 506 along with sending and receiving various messages, alerts, packets, etc. One such frame that may be exchanged between the servers 502, 504, 506 and the controller 526 is a Pause Frame indicating congestion on one or more VMs of a particular virtual switch.

In one embodiment, each virtual switch 508, 510, 512 is configured to notify the controller 526, such as an SDN controller, a switch controller, a Distributed Overlay Virtual Ethernet (DOVE) controller, etc., about congestion at any of the VMs hosted by the respective virtual switch, such as by using a congestion notification message that is sent directly to the controller 526.

In response to receiving the congestion notification message from the affected virtual switch, the controller 526 distributes a congestion status message to one or more virtual switches 508, 510, 512 that are managed by the controller 526 in the various servers 502, 504, 506 in the network 500. In one embodiment, the controller 526 does not distribute the congestion status message to the virtual switch that sent the congestion notification message to the controller 526, e.g., virtual switch 510. Each of these virtual switches 508, 510, 512 is configured to send traffic to the overloaded VM, e.g., VM 518. However, the congestion status message that is sent to the one or more virtual switches 508, 510, 512 acts as a Pause Frame for any traffic that is destined for the overloaded VM 518 only, and does not act like a Pause Frame for traffic that is destined for VMs other than the overloaded VM 518 on server 504, e.g., traffic intended for VM 520 is unaffected by the congestion status message.

A buffer may be used to cache or store packets which are destined for any overloaded VMs, such as VM 518 in the present example. This buffer may be utilized for storage of incoming packets or outgoing packets. In one embodiment, in response to a virtual switch on a particular physical server receiving a congestion status message indicating a local VM hosted by the particular physical server is overloaded, the virtual switch may utilize the buffer to cache incoming packets destined for the local overloaded VM. In another embodiment, in response to a virtual switch on a particular physical server receiving a congestion status message indicating a remote VM hosted by another physical server is overloaded, the virtual switch may utilize the buffer to cache outgoing packets destined for the remote overloaded VM.

Each server 502, 504, 506 may have a buffer 528, 530, 532, respectively, for caching packets, and this buffer may be used to cache packets that are destined for an overloaded VM on a different server, and/or may be used to cache packets that are destined for an overloaded VM that is hosted locally by the server which maintains the local buffer. Each buffer 528, 530, 532 may be used to cache packets during a congestion period when a VM is overloaded, and may release the packets for processing once the congestion on the VM is cleared, in response to the respective server 502, 504, 506 receiving a congestion status message from the controller 526 indicating that the congestion on the VM is cleared. This congestion status message which clears the congestion travels from the virtual switch 510 that monitors the (no longer) overloaded VM 518 to the controller 526, and is then forwarded to all other virtual switches 508, 512 in the network 500. As previously indicated, virtual switch 510 does not need to receive this congestion status message, as it is already aware of the congestion status of all local VMs 518, 520 hosted by physical server 504.

Collaboration between each VM, each virtual switch, and the controller allows for this VM-to-VM flow control to operate efficiently. Of course, more or less physical servers, VMs, virtual switches, virtualization platforms, etc., may be included in the network 500 according to particular design constraints, requirements, etc.

According to one embodiment, the controller 526 manages the congestion status of each VM in the network 500, thereby ensuring that in response to any VM becoming overloaded, traffic that is sent to that VM is slowed and/or stopped entirely. Traffic may be slowed as a result of servers, that are configured to manage these congestion notification messages, no longer forwarding traffic to an overloaded VM, while a local buffer on a server hosting an overloaded VM may be used to cache traffic directed to an overloaded VM that is received while the VM is still overloaded, such as from sources that are not able to handle congestion notification messages from the controller 526. Then, the virtual switch may send traffic from the buffer to the overloaded VM at a rate that ensures that an overflow condition in which packets must be dropped is not reached.

In one approach, the controller 526 may instruct one or more servers to cache traffic directed to an overloaded VM in a local buffer to keep this traffic from being dropped, either at the receiving end or at the transmission end. In another embodiment, the controller 526 may send the congestion notification message and a server receiving that message may, in response, make the decision to cache outgoing traffic destined for an overloaded VM without being explicitly instructed to do so. This decision may be based on space being available in the local cache, space being available in the remote cache, when the congestion condition is determined, etc. In one non-limiting example, when space is not available in the local buffer 528, virtual switch 508 may send traffic to the overloaded VM 518, with the expectation that virtual switch 510 will store packets in its local buffer 530. In another non-limiting example, when space is not available in the remote buffer 530 accessible to server 504, virtual switch 508 may store packets to the local buffer 528 instead of sending it to the overloaded VM 518.

When the VM-to-VM flow control is utilized in a virtualized overlay network environment, the above procedures may be used to provide the flow control. However, the techniques and procedures described herein are not limited to being applied to an overlay network, and the direct congestion notification message may be used in conjunction with various implementations of SDNs, among other network and environments not specifically described.

The overloaded VM 518 may be overloaded for any reason, such as a lack of resources (power, memory, processing capacity and/or power, etc.) to handle the packets that have already been sent to the VM 518. In response, VM 518 determines that it is in a congestion state, and will share this status with the local virtual switch 510, which reports using a congestion notification message to the controller 526, which responds by notifying all possible sources of traffic to the overloaded VM 518, such as all other servers, of the congestion status of the VM 518. In a further embodiment, the controller 526 may instruct other servers to stop sending new traffic to VM 518.

In one embodiment, VM 518 may generate an IEEE 802.3x X-OFF Pause Frame (i.e., Pause Frame with timer=0xFFFF) and transmit the Pause Frame to virtual switch 510.

In response to virtual switch 510 receiving the X-OFF Pause Frame from VM 518, virtual switch 510 stops transmitting network traffic to VM 518. In one embodiment, virtual switch 510 caches all packets destined to VM 518 in its local buffer 530. In addition, virtual switch 510 is configured to notify the controller 526 that VM 518 is overloaded using a congestion notification message.

In response to the controller 526 receiving the congestion notification message, controller 526 advertises the congestion status of VM 518 to all other virtual switches using congestion status messages. Accordingly, virtual switch 508 receives a congestion status message from the controller 526, and new packets that arrive from VM 514 that are destined to VM 518 are buffered in the buffer 530. In return, an X-OFF Pause Frame is generated by the virtual switch 508 to inform VM 514 to stop sending traffic to VM 518.

VM 514 responds to the received X-OFF Pause Frame and stops sending packets to VM 518. After some time, VM 518 once again is capable of handling traffic (enough resources are available) and is able to resume receiving new packets (packets are no longer backed up beyond a threshold amount). VM 518 generates an IEEE 802.3x X-ON Pause Frame (a Pause Frame with timer=0x0000) and transmits it to virtual switch 510. This IEEE 802.3x X-ON Pause Frame acts as a congestion notification message.

Virtual switch 510 receives the X-ON Pause Frame and resumes sending traffic to VM 518. Virtual switch 510 also sends the X-ON Pause Frame to the controller 526 indicating the congestion is cleared on VM 518. Again, this X-ON Pause Frame acts as a congestion notification message that the virtual switch 510 transmits to the controller 526.

In response to receiving this X-ON Pause Frame from the virtual switch 510, the controller 526 sends a congestion status message to one or more virtual switches in the network to advertise that congestion on VM 518 is cleared. In an alternate embodiment, controller 526 may send a congestion status message only to virtual switches other than virtual switch 510 to advertise that congestion on VM 518 is cleared, since virtual switch 510 is already aware of the congestion status of VM 518. Thereafter, virtual switch 508 receives the congestion status message from the controller 526 and resumes sending packets to VM 518. Additionally, a X-ON Pause Frame that acts as a congestion notification message is generated by virtual switch 508 and sent to the originating traffic source, VM 514. In response to VM 514 receiving the X-ON Pause Frame, VM 514 resumes sending packets to VM 518.

Figure 6:
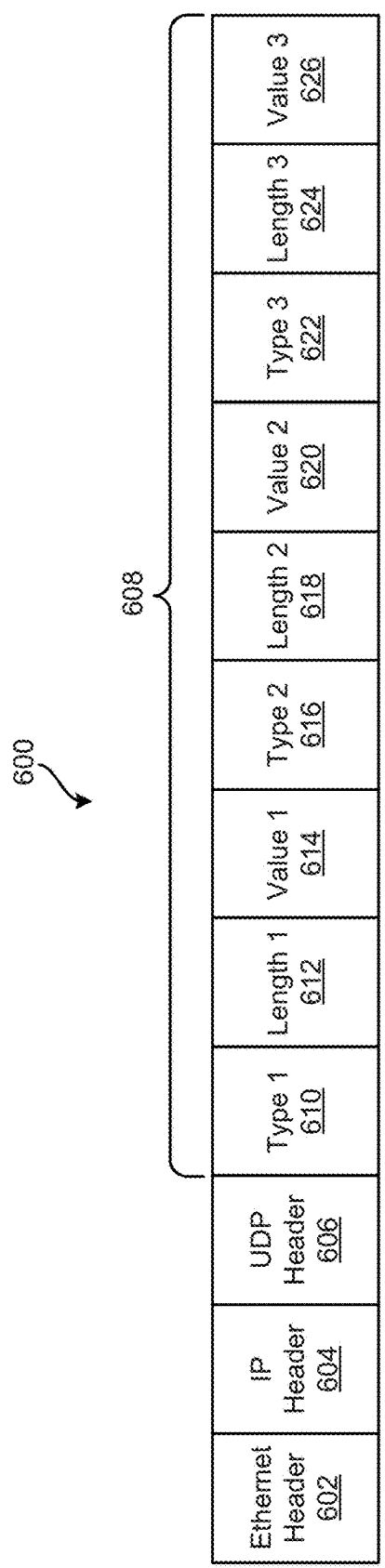
FIG. 6 is a diagram of a packet format according to one embodiment.

FIG. 6 shows a packet format 600 according to one embodiment. Packet format 600 may be used for the various congestion notification and status messages that are sent to virtual switches in a network to provide VM-to-VM flow control as discussed with respect to FIG. 5. Referring again to FIG. 6, as shown, the packet format 600 includes an Ethernet header 602, an IP header 604, and a UDP header 606, all of which may be of a type known in the art for sending packets of data through a network. In addition, congestion status information 608 is included in the packet format 600. In one embodiment, the congestion status information 608 may utilize a type-length-value (TLV) format to convey the congestion status information, as shown. In other embodiments, other types of information formatting may be used to convey the congestion status information, as would be apparent to one of skill in the art upon reading the present descriptions.

The TLV format used to convey the congestion status information 608 may include, as shown in FIG. 6 according to one embodiment, a first type field 610, a first length field 612, and a first value field 614. Additionally, the TLV format may include as many other TLV fields as desired, and two more such sets are shown in FIG. 6: a second type field 616, a second length field 618, a second value field 620, a third type field 622, a third length field 624, and a third value field 626. However, more or less TLV fields may be included in the packet format 600 as are desired and useful in conveying congestion status information.

In one embodiment, a predetermined byte value (such as 0x00 or some other suitable value) may be used to terminate the TLV.

The one or more type fields, in various embodiments, may be set to a predetermined value which represents what type of information will be included in a corresponding length and/or value field. The type of information may be anything that will uniquely identify which VM is conveying a congestion status. In various embodiments, the type field may have a value which indicates that the length and/or value field will include a MAC address of the VM, an IP address of the VM, a virtualization platform IP address and VM name, or some other identifying information known in the art.

The one or more length fields, in various embodiments, may be set to a predetermined unique VM identifier which represents which VM is conveying a congestion status, or may have a value which indicates a MAC address of the VM, an IP address of the VM, a virtualization platform IP address and VM name, or some other identifying information known in the art.

The one or more value fields may be used to indicate whether the congestion status is ON (the VM is congested and no additional traffic should be sent to the VM) or OFF (the VM is not congested and may accept additional traffic).

Figure 7:
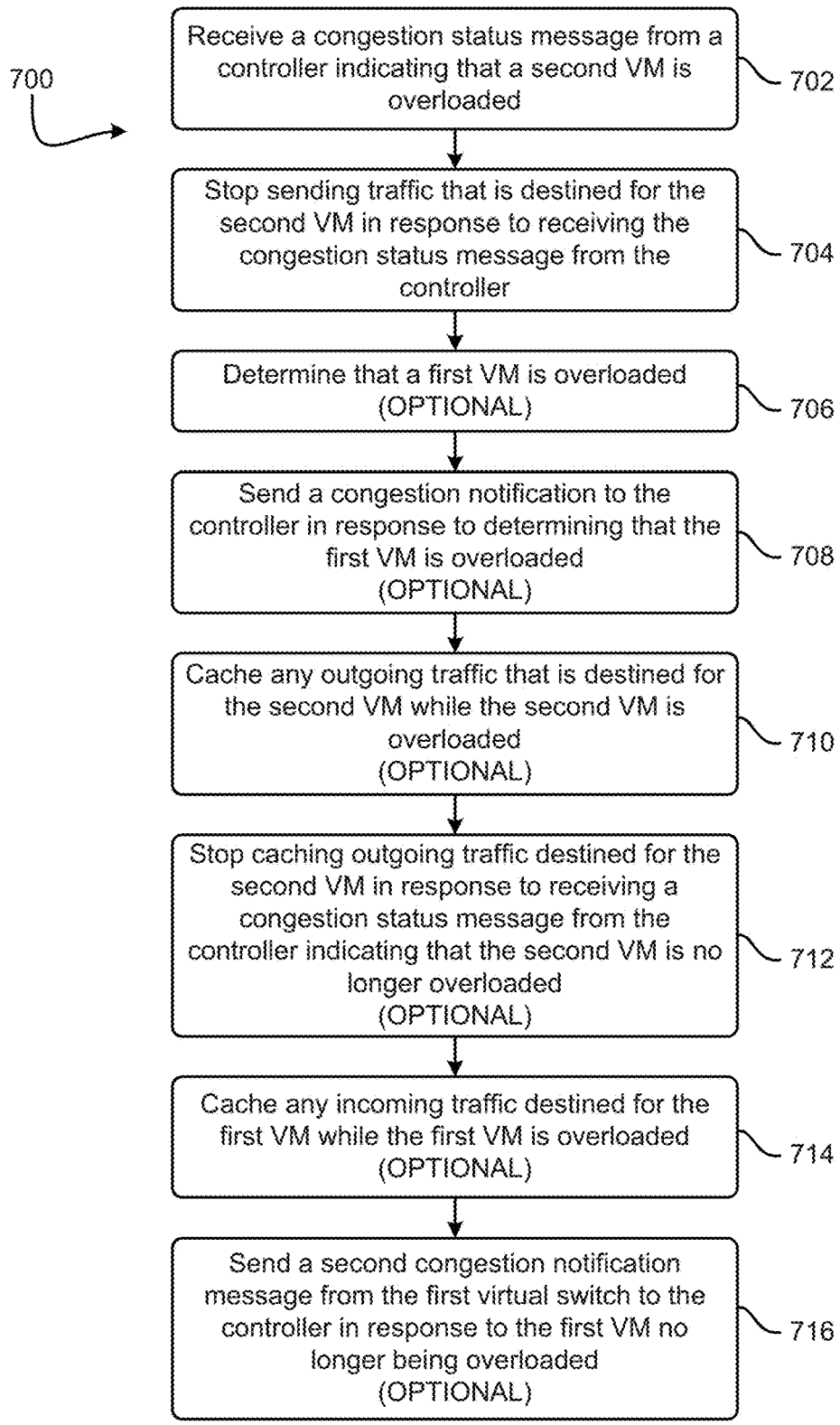
FIG. 7 is a flowchart of a method, according to one embodiment.

FIG. 7 is a flowchart of a method 700, according to one embodiment. Method 700 provides VM-to-VM flow control and may be performed in accordance with the present invention in the operating environments depicted in FIGS. 1-6, among others, in various embodiments. Of course, more or less operations than those specifically described in FIG. 7 may be included in method 700, as would be understood by one of skill in the art upon reading the present descriptions.

Each of the steps of the method 700 may be performed by any suitable component of the operating environment. For example, in various embodiments, the method 700 may be partially or entirely performed by a mainframe, a server, a controller, an operating system of a server, a virtual switch, a virtualization platform of a server, or some other device having one or more processors and logic integrated with and/or executable by the processors. The processor, e.g., processing circuit(s), chip(s), and/or module(s) implemented in hardware and/or software, and preferably having at least one hardware component, may be utilized in any device to perform one or more steps of the method 700. Illustrative processors include, but are not limited to, a CPU, an ASIC, a FPGA, etc., combinations thereof, or any other suitable computing device known in the art.

As shown in FIG. 7, method 700 may initiate with operation 702, in which a first virtual switch, e.g., virtual switch 510 of FIG. 5, hosted on a first server, e.g., physical server 504, receives a congestion status message from a controller, e.g., controller 526, indicating that a second VM of a second server is overloaded. The controller may be any type of controller known in the art, such as a switch controller, a DOVE controller, a SDN controller, etc.

This congestion status message may utilize a TLV format, such as packet format 600 in FIG. 6, that conveys the identity of the second VM that is overloaded, and the second server on which the second VM resides, in one embodiment. This congestion status message may also identify a second virtual switch on the second server which handles packets destined for the second VM.

Referring again to FIG. 7, in operation 704, in response to receiving the congestion status message from the controller, the first virtual switch stops sending any traffic that is destined for the second VM without restricting traffic that is destined for other VMs hosted by the second server. In this way, the first virtual switch will stop transmitting packets destined for the second VM only in response to receiving the congestion status message from the controller without restricting transmission of packets to any other VMs of the second server.

In optional operation 706, the first server may determine that a first VM, e.g., VM 518 of FIG. 5, is overloaded. The first VM may be hosted by the first server, and may have traffic sent to the first VM and from the first VM through the first virtual switch. Any technique may be used to determine that the first VM is overloaded, such as determining that a latency of packets passing through the first VM has increased past an acceptable threshold, determining that insufficient resources exist to process additional packets, determining that an amount of packets backed up waiting to be sent by the first VM has exceeded a predetermined threshold, determining that the first VM is dropping packets due to being overwhelmed, etc.

The first VM is overloaded whenever sending additional packets to the first VM will result in one or more of those packets being dropped due to congestion at the first VM, insufficient processing resources for the first VM to process additional packets, insufficient storage resources for the first VM to store additional packets, a backlog of packets waiting to be processed by the first VM exceeding a predetermined threshold, a buffer overrun where packets at the first VM are dropped in order to allow more packets to be stored prior to processing, etc.

In one embodiment, the first server may determine that the first VM is overloaded in response to the first VM not having sufficient resources to process additional packets.

The first server may determine that the first VM is overloaded in response to receiving a congestion notification message from the first VM at the first virtual switch. The congestion notification message indicates a congestion status of the first VM. When the first VM is overloaded, the congestion status indicates that the first VM is overloaded, and when the first VM is not overloaded, the congestion status indicates that the first VM is not overloaded.

In optional operation 708, the first virtual switch sends the locally generated congestion notification message to the controller in response to determining that the first VM is overloaded, such as by receiving the congestion notification message at the first virtual switch from the first VM.

In this or any other embodiment, the congestion notification message may be a pause frame, such as an IEEE802.3x X-OFF Pause Frame (i.e., Pause Frame with timer=0xFFFF).

In optional operation 710, the first server may cache any outgoing traffic that is destined for the second VM while the second VM is overloaded. A buffer local to the first server, e.g., buffer 530 of FIG. 5, may be used to cache this outgoing traffic during a period of time when the second VM is overloaded.

Referring again to FIG. 7, in optional operation 712, the first server may stop caching outgoing traffic destined for the second VM in response to receiving a congestion status message from the controller indicating that the second VM is no longer overloaded. In response to receiving the congestion status message indicating that the second VM is no longer overloaded, the first server may resume normal transmission of packets to the second VM.

In optional operation 714, the first server may cache any incoming traffic destined for the first VM while the first VM is overloaded. The first server stops caching incoming traffic destined for the first VM in response to determining that the first VM is no longer overloaded. A buffer local to the first server, e.g., buffer 530 of FIG. 5, may be used to store the packets until the first VM is no longer overloaded.

Referring again to FIG. 7, in optional operation 716, in response to the first VM no longer being overloaded and being able to process additional packets, the first virtual switch may send a second congestion notification message to the controller indicating that the congestion status of the first VM is cleared. In this embodiment, the second congestion status message indicates that the first VM is no longer overloaded, and may be sent in response to the first VM sending the second congestion notification message to the first virtual switch. This second congestion notification message indicates that the first VM is not overloaded (no longer overloaded), and in one embodiment, may be an IEEE 802.3x X-ON Pause Frame (a Pause Frame with timer=0x0000). After the congestion status is cleared indicating that first VM is no longer overloaded, traffic may resume being sent to the first VM.

Figure 8:
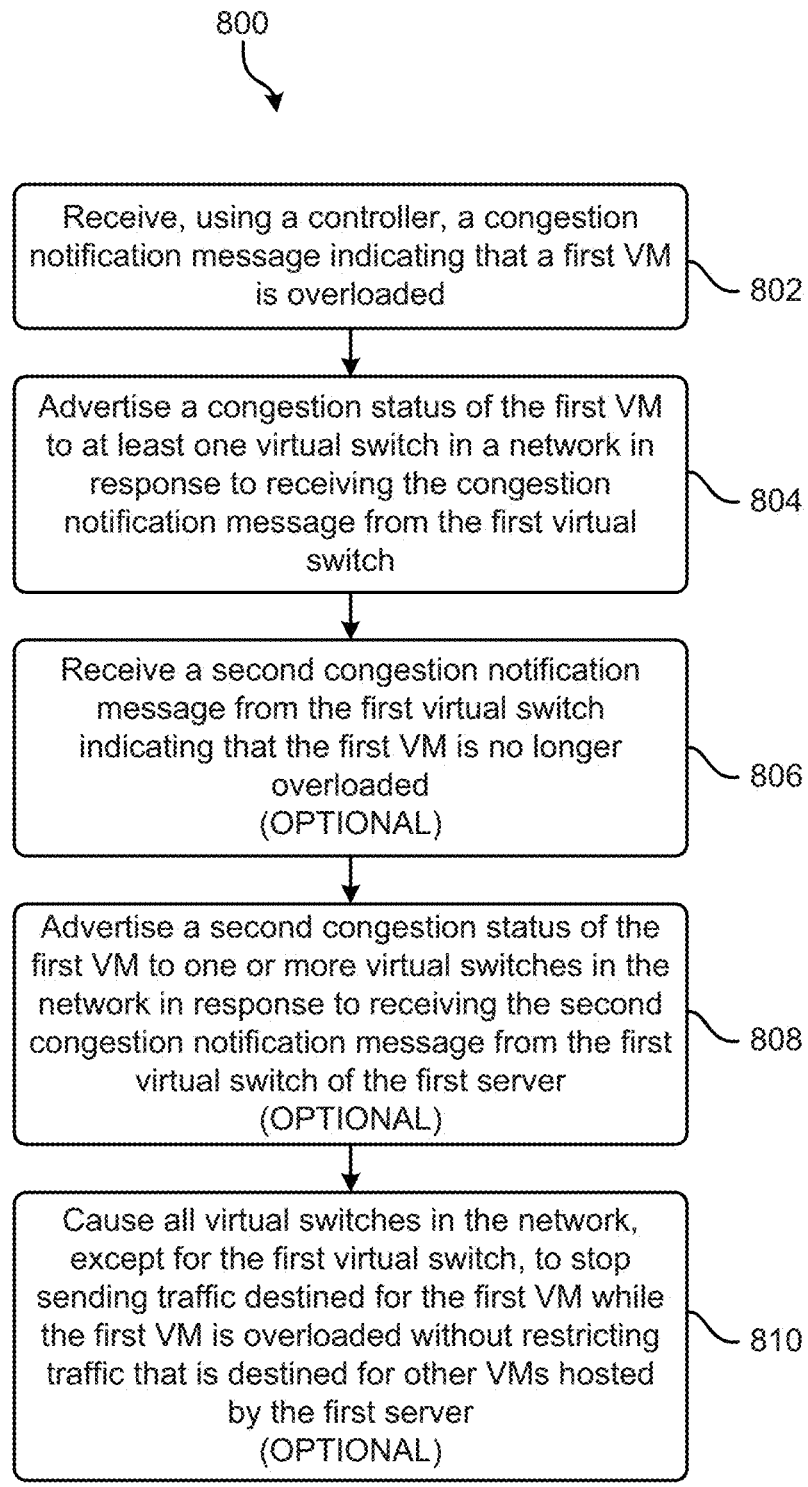
FIG. 8 is a flowchart of a method, according to one embodiment.

FIG. 8 is a flowchart of a method 800, according to one embodiment. Method 800 provides VM-to-VM flow control and may be performed in accordance with the present invention in the operating environments depicted in FIGS. 1-6, among others, in various embodiments. Of course, more or less operations than those specifically described in FIG. 8 may be included in method 800, as would be understood by one of skill in the art upon reading the present descriptions.

Each of the steps of the method 800 may be performed by any suitable component of the operating environment. For example, in various embodiments, the method 800 may be partially or entirely performed by a mainframe, a server, a controller, an operating system of a server, a virtual switch, a virtualization platform of a server, or some other device having one or more processors and logic integrated with and/or executable by the processors. The processor, e.g., processing circuit(s), chip(s), and/or module(s) implemented in hardware and/or software, and preferably having at least one hardware component, may be utilized in any device to perform one or more steps of the method 800. Illustrative processors include, but are not limited to, a CPU, an ASIC, a FPGA, etc., combinations thereof, or any other suitable computing device known in the art.

As shown in FIG. 8, method 800 may initiate with operation 802, in which a controller, e.g., controller 526 of FIG. 5, receives a congestion notification message indicating that a first VM is overloaded. The controller may receive the congestion notification message from a first virtual switch, e.g., virtual switch 510 of FIG. 5, on a first server, e.g., physical server 504 of FIG. 5. The first virtual switch may send the congestion notification message to the controller in response to determining that the first VM is overloaded. The controller may be any type of controller known in the art, such as a switch controller, a DOVE controller, a SDN controller, etc.

In one embodiment, the congestion notification message may be a pause frame that the first virtual switch forwards after receiving it from the first VM. The congestion notification message may indicate that the first VM is overloaded and that transmission of packets to the first VM should be stopped until the congestion status is cleared.

Referring again to FIG. 8, in operation 804, the controller advertises a congestion status of the first VM to at least one virtual switch in a network in response to receiving the congestion notification message from the first virtual switch. The controller may advertise the congestion status by sending a congestion status message to one or more virtual switches in the network, e.g., one or more of virtual switches 508, 510, and 512 of FIG. 5. The congestion status message may indicate that the first VM is overloaded, and may identify the first VM, the first virtual switch, and/or the first server which hosts the first VM.

In one embodiment, the controller may send the congestion status message indicating that the first VM is overloaded to all virtual switches in the network. In an alternate embodiment, the controller may send the congestion status message indicating that the first VM is overloaded to all virtual switches except for the first virtual switch which sent the congestion notification message indicating that the first VM is overloaded to the controller.

In one embodiment, the congestion status message may utilize a TLV formatted packet to convey information relating to the overloaded first VM, as discussed in more detail in FIG. 6.

Referring again to FIG. 8, in optional operation 806, the controller may receive a second congestion notification message from the first virtual switch indicating that the first VM is no longer overloaded. This second congestion notification message may be a pause frame that indicates that traffic may be sent to the first VM. After the congestion status is cleared indicating that first VM is no longer overloaded, traffic may resume being sent to the first VM.

In optional operation 808, the controller may advertise a second congestion status (in this case indicating that the congestion is cleared) of the first VM to one or more virtual switches in the network in response to receiving the second congestion notification message from the first virtual switch of the first server. In this embodiment, the second congestion status indicates that the first VM is no longer overloaded, and may be sent using a second congestion status message. In response to receiving such a congestion status message, all virtual switches in the network which received the congestion status message are alerted that normal transmission of data to the first VM may resume.

In optional operation 810, the controller may cause all virtual switches in the network, except for the first virtual switch which is already aware of the congestion status of the first VM, to stop sending traffic destined for the first VM while the first VM is overloaded without restricting traffic that is destined for other VMs hosted by the first server.

In one embodiment, the first congestion notification message may be a pause frame, such as an IEEE802.3x X-OFF Pause Frame (i.e., Pause Frame with timer=0xFFFF). In response to the first VM no longer being overloaded and being able to process additional packets, the first VM may send a second congestion notification message to the virtual switch of the first server. This second congestion notification message indicates that the first VM is not overloaded, and in one embodiment, may be an IEEE 802.3x X-ON Pause Frame (a Pause Frame with timer=0x0000). Therefore, the controller may receive the same second congestion notification message that is forwarded from the first VM to the first virtual switch, and then on to the controller.

There are several advantages of using VM-to-VM flow control, as described herein in various embodiments. Some advantages include that the VM HOL blocking issue in virtualized environments is overcome. Traditional flow control is likely to be used in physical networks with heterogeneous hardware platforms from different vendors. However, VM-to-VM flow control eliminates the dependency on different hardware devices, which is easier to deploy, cost efficient, and capable of faster deployment.

Another advantage is that the responsiveness of flow control is improved over traditional flow control techniques. Notification is directly sent to the traffic originator, and does not require the traffic back pressure on all intermediate equipment on a hop-by-hop basis through the underlay network like in traditional flow control. Also, general extensibility is provided to IEEE 802.1Qbb PFC in case PFC is used in the virtualization environment.

In one embodiment, a system includes a virtual switch of a first server in communication with at least a first VM hosted by the first server, the virtual switch of the first server being configured to receive a first message from the first VM indicating that the first VM is overloaded and send a congestion notification message in response to receiving the first message, the congestion notification message indicating a congestion status of the first VM, and a controller which is in communication with a plurality of servers in a network including the first server, the controller being configured to receive the congestion notification message from the virtual switch of the first server and advertise the congestion status of the first VM to all virtual switches in the network in response to receiving the congestion notification message.

The system may also include a virtual switch of a second server in communication with at least a second VM hosted by the second server, the virtual switch of the second server being configured to stop sending packets that are destined for the first VM to the virtual switch of the first server in response to receiving the congestion status from the controller without restricting transmission of packets to any other VMs of the first server, send a pause frame to any VMs hosted by the second server which are sending traffic to the first VM on the first server to cause the VMs hosted by the second server to stop sending traffic to the first VM, and cache any outgoing traffic that is destined for the first VM while the first VM is overloaded.

The first VM may be further configured to determine that the first VM is overloaded in response to the first VM not having sufficient resources to process additional packets, wherein the first message is a pause frame, send a second message to the virtual switch of the first server in response to determining that the first VM is not overloaded, the second message indicating that the first VM is not overloaded, and cache any incoming traffic that is destined for the first VM while the first VM is overloaded.

The controller may be further configured to advertise a second congestion status of the first VM to all virtual switches in the network in response to receiving a second congestion notification message from the virtual switch of the first server.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product comprising a computer readable storage medium having program instructions embodied therewith, the embodied program instructions executable by one or more processors to cause at least one of the one or more processors to:
   receive, using a first virtual switch of a first server, a congestion status message from a physical switch controller, the congestion status message indicating that a second virtual machine (VM) is overloaded, the second VM being hosted by a second server;
   stop sending traffic, from the first virtual switch, that is destined for the second VM without restricting sending traffic from the first virtual switch that is destined for other VMs hosted by the second server in response to receiving the congestion status message from the controller;
   send traffic from the first virtual switch that is destined for at least one of the other VMs hosted by the second server;
   receive, at the first virtual switch, a congestion notification message from a first VM hosted by the first server, the congestion notification message indicating a congestion status of the first VM and having been generated in response to a determination that the first VM is overloaded due to lack of sufficient resources to process additional packets; and
   send the congestion notification message from the first virtual switch to the controller in response to the first virtual switch receiving the congestion notification message,
   wherein the controller, the first server, and the second server are discrete devices.

2. The computer program product as recited in claim 1, wherein the embodied program instructions are further executable by the one or more processors to cause at least one of the one or more processors to:
   cache, using the first virtual switch of the first server, any incoming traffic that is destined for the first VM while the first VM is overloaded.

3. The computer program product as recited in claim 1, wherein the embodied program instructions are further executable by the one or more processors to cause at least one of the one or more processors to:

cache, using the first virtual switch of the first server, any outgoing traffic that is destined for the second VM while the second VM is overloaded.

4. The computer program product as recited in claim 1, wherein the embodied program instructions are further executable by the one or more processors to cause at least one of the one or more processors to:

receive, at the first virtual switch, a second congestion notification message from the first VM, the second congestion notification message indicating a second congestion status of the first VM and having been generated in response to a determination that the first VM is not overloaded; and send the second congestion notification message from the first virtual switch to the controller in response to receiving the second congestion notification message at the first virtual switch.

5. A computer program product comprising a computer readable storage medium having program instructions embodied therewith, the embodied program instructions executable by a physical switch controller to cause the controller to:

receive, by the physical switch controller, a congestion notification message from a first virtual switch of a first server indicating that a first virtual machine (VM) hosted by the first server is overloaded;

advertise, by the controller, a congestion status of the first VM in a congestion status message to one or more virtual switches in a network in response to receiving the congestion notification message; and cause, by the controller, all virtual switches in the network except for the first virtual switch to stop sending traffic destined for the first VM while the first VM is overloaded without restricting sending traffic that is destined for other VMs hosted by the first server, wherein the congestion status message is not sent to the first virtual switch.

6. The computer program product as recited in claim 5, wherein the one or more virtual switches comprise all virtual switches in the network except for the first virtual switch from which the congestion notification message was received.

7. The computer program product as recited in claim 5, wherein the congestion status message utilizes a type-length-value (TLV) format to advertise the congestion status of the first VM.

8. The computer program product as recited in claim 5, wherein the embodied program instructions are further executable by the controller to cause the controller to:

receive a second congestion notification message from the first virtual switch indicating that the first VM is no longer overloaded; and advertise a second congestion status of the first VM in a second congestion status message to the one or more virtual switches in the network in response to receiving the second congestion notification message, wherein the second congestion status message is not sent to the first virtual switch.

9. The computer program product as recited in claim 8, wherein the embodied program instructions are further executable by the controller to cause the controller to provide control plane functionality to the first virtual switch of the first server.

10. A method comprising:

receiving, using a physical switch controller, a congestion notification message from a first virtual switch of a first server indicating that a first virtual machine (VM) hosted by the first server is overloaded;

advertising, using the controller, a congestion status of the first VM to one or more virtual switches in a network using a congestion status message in response to receiving the congestion notification message; and causing, using the controller, all virtual switches in the network except for the first virtual switch to stop sending traffic destined for the first VM while the first VM is overloaded without restricting sending traffic that is destined for other VMs hosted by the first server.

11. The method as recited in claim 10, wherein the one or more virtual switches comprise all virtual switches in the network except for the first virtual switch from which the congestion notification message was received.

12. The method as recited in claim 10, wherein the congestion status message utilizes a type-length-value (TLV) format to advertise the congestion status of the first VM.

13. The method as recited in claim 10, further comprising:

receiving, using the controller, a second congestion notification message from the first virtual switch indicating that the first VM is no longer overloaded; and advertising, using the controller, a second congestion status of the first VM in a second congestion status message to one or more virtual switches in the network in response to receiving the second congestion notification message, wherein the second congestion status message is not sent to the first virtual switch.

14. The method as recited in claim 10, further comprising providing, using the controller, control plane functionality to the first virtual switch of the first server.

15. The method as recited in claim 10, further comprising:

causing, using the controller, all virtual switches in the network except for the first virtual switch to stop sending traffic destined for the first VM while the first VM is overloaded without restricting sending traffic that is destined for other VMs hosted by the first server.

16. The method as recited in claim 15, further comprising:

causing, using the controller, all servers in the network to cache any outgoing traffic that is destined for the first VM while the first VM is overloaded; and causing, using the controller, the first server to cache any incoming traffic that is destined for the first VM while the first VM is overloaded.

17. The method as recited in claim 16, further comprising:

receiving, using the controller, a second congestion notification message from the first virtual switch indicating that the first VM is no longer overloaded; and advertising, using the controller, a second congestion status of the first VM in a second congestion status message to one or more virtual switches in the network in response to receiving the second congestion notification message, wherein the second congestion status message is not sent to the first virtual switch.

18. The method as recited in claim 17, further comprising:

allowing, using the controller, all virtual switches in the network to resume sending traffic destined for the first VM.

19. The method as recited in claim 10, further comprising:
providing, using the controller, control plane functionality to the first virtual switch of the first server.

* * * * *